F. H. COOK AND E. B. SANDMANN.
TRACTOR FRAME.
APPLICATION FILED MAY 26, 1919.
1,323,835.
Patented Dec. 2, 1919.
3 SHEETS—SHEET 1.
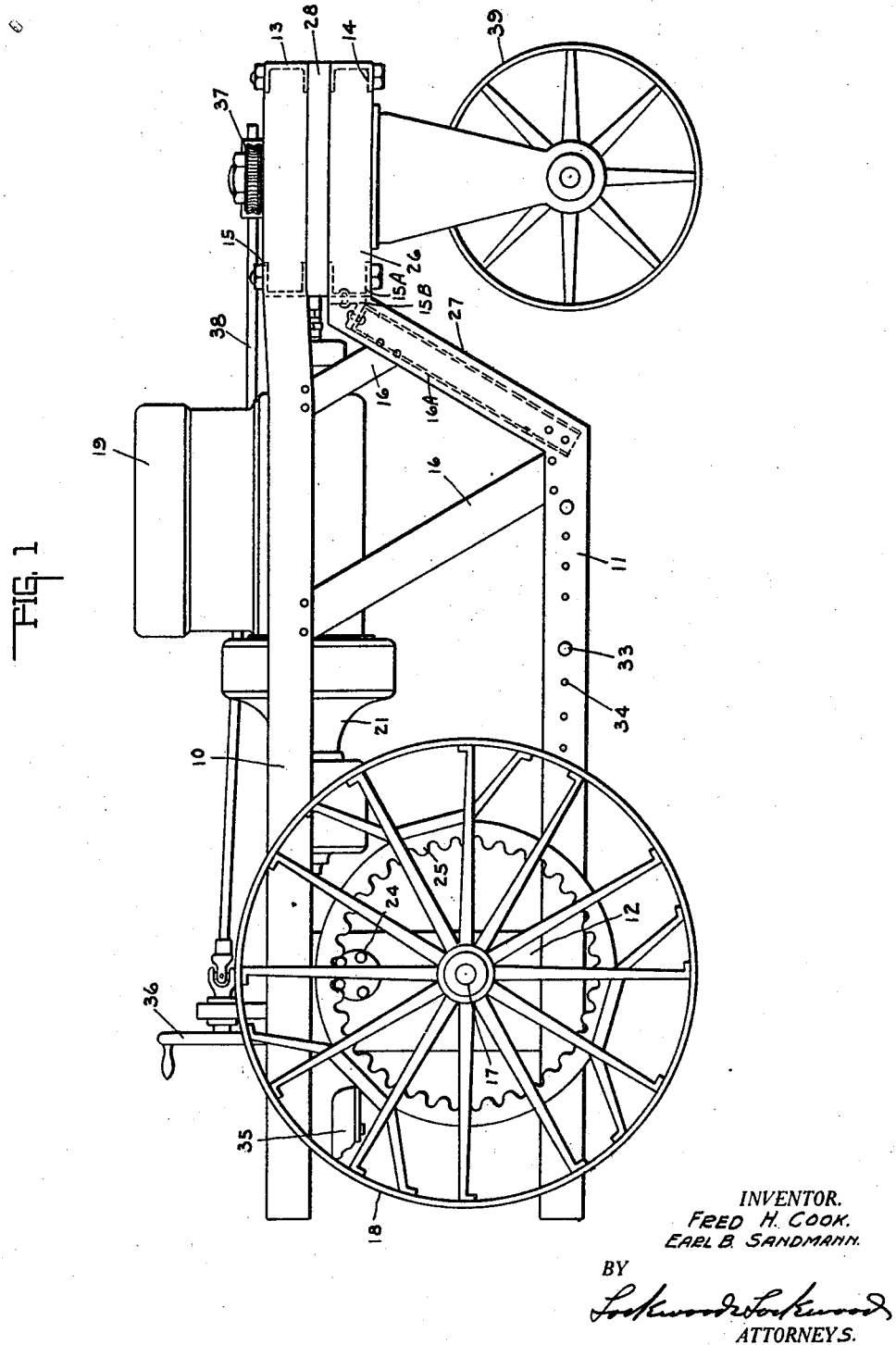
INVENTOR.
FRED H. COOK.
EARL B. SANDMANN.
BY
*Lockwood & Lockwood*
ATTORNEYS.

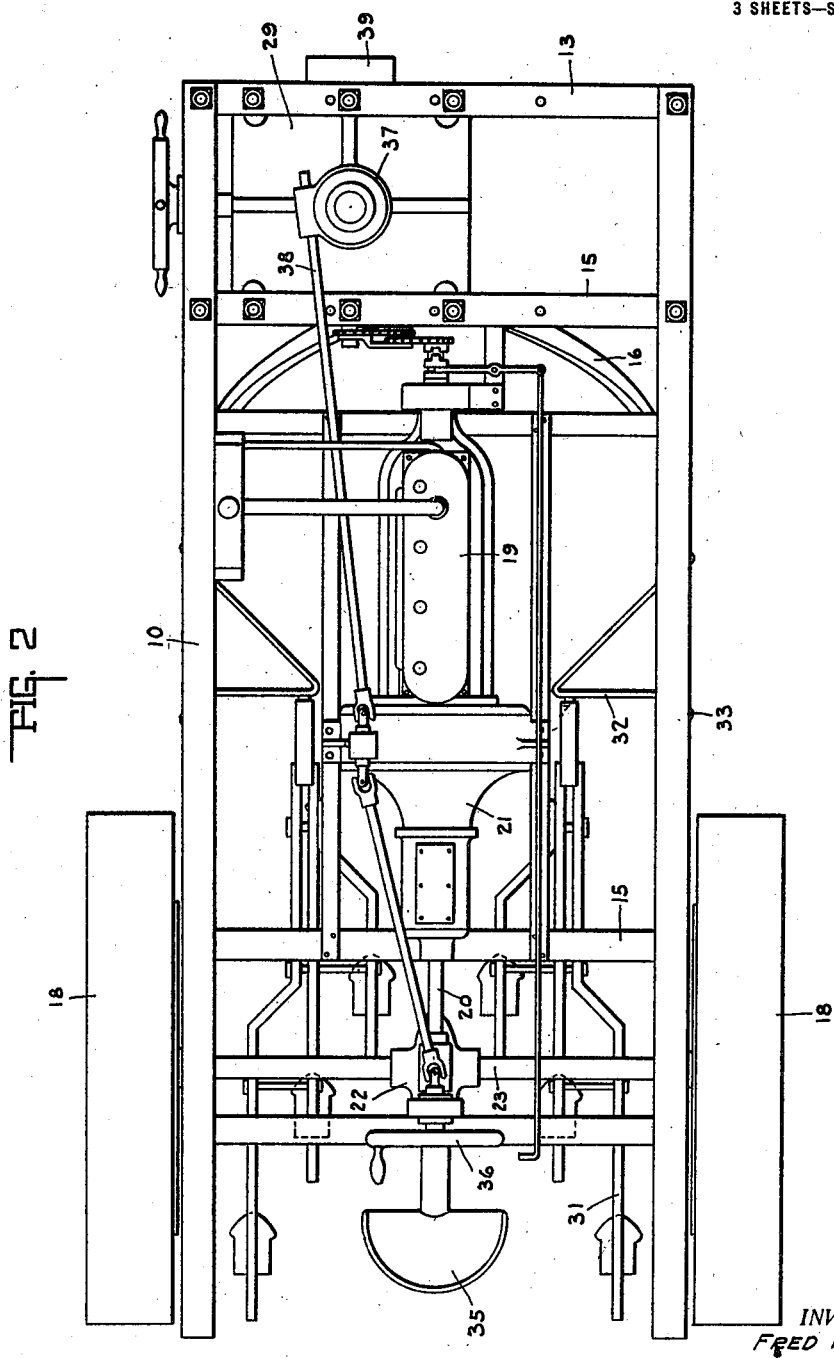

F. H. COOK AND E. B. SANDMANN.
TRACTOR FRAME.
APPLICATION FILED MAY 26, 1919.
1,323,835.
Patented Dec. 2, 1919.
3 SHEETS—SHEET 3.
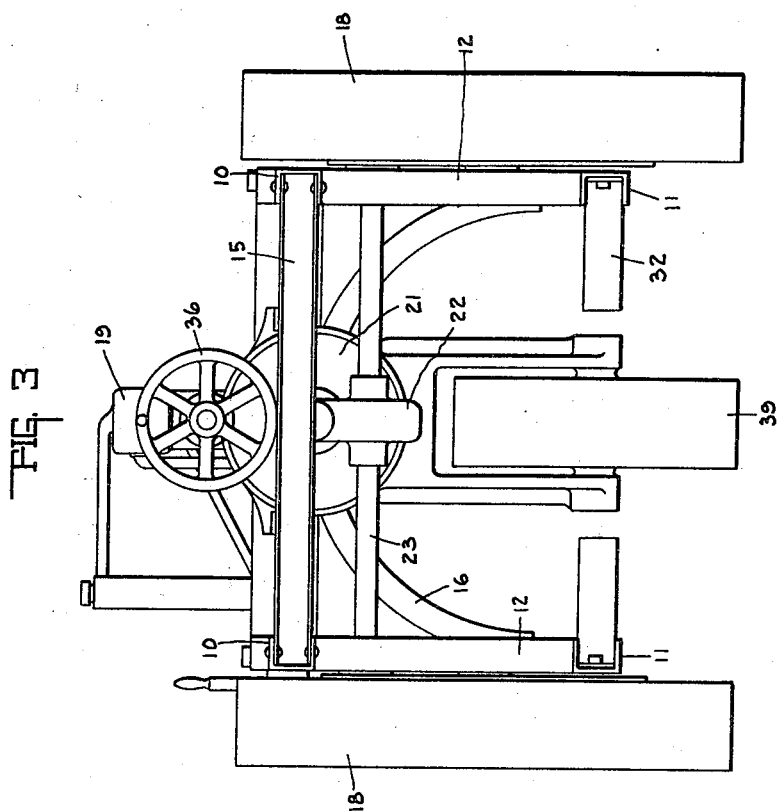
INVENTOR.
FRED H. COOK.
EARL B. SANDMANN.
BY
ATTORNEYS.

UNITED STATES PATENT OFFICE.

FRED H. COOK AND EARL B. SANDMANN, OF INDIANAPOLIS, INDIANA.

TRACTOR-FRAME.

1,323,835.    Specification of Letters Patent.    Patented Dec. 2, 1919.

Original application filed August 26, 1918, Serial No. 251,551. Divided and this application filed May 26, 1919. Serial No. 299,702.

*To all whom it may concern:*

Be it known that we, FRED H. COOK and EARL B. SANDMANN, citizens of the United States, and residents of Indianapolis, county of Marion, and State of Indiana, have invented a certain new and useful Tractor-Frame; and we do hereby declare that the following is a full, clear, and exact description thereof, reference being had to the accompanying drawings, in which like numerals refer to like parts.

This invention relates to tractors and especially that type of tractor adapted to cultivating purposes.

The main object of this invention is the construction and arrangement of the tractor frame used in connection with the construction shown in our application Serial No. 251,551 filed August 26, 1918 for a tractor, of which this application is a division, the main feature of which is to permit the cultivation of corn or the like after it has reached a considerable height without breaking off the stalk. This is accomplished by doing away with the ordinary construction of the rear axle and providing in place thereof a high arch frame which will clear the corn stalks and the like.

Another feature of the invention is the means for driving the tractor wheels other than by the ordinary rear axle construction whereby the arch frame will not interfere with the driving mechanism.

A further feature of this invention is the provision of means for adjustably attaching the parts of farm machinery to the frame of the tractor, whereby such machinery will always be in position to be readily controlled by the attendant on the tractor and under the direct observation thereof.

In the accompanying drawings which are made a part of this application Figure 1 is a side elevation of the tractor. Fig. 2 is a top plan view of the tractor showing the means for attaching parts of farm machinery thereto. Fig. 3 is a rear elevation of the tractor.

In the drawings there is shown a tractor frame having upper bars 10 and lower bars 11, said bars being preferably channel shaped in cross section and attached to the uprights 12 mounted on the rear of said frame, for supporting the rear end of said bars, while the forward ends thereof are connected together by the cross bars 13 and 14 respectively. The upper bars 10 are further reinforced by intermediate cross bars 15, and the forward portion of the bars 11 are suitably braced by means of the arch bars 16 which extend from the lower side bars 11 upward and are secured to the intermediate bars $15^A$ by means of the member $15^B$ the forward end of the side bars 11 being extended upwardly, adjacent their forward ends, and then forwardly so that the extreme horizontal portion of the bars 11 will extend parallel with the bars 10. The frame is further braced by the braces 16 which are secured at their upper end to the upper bars 10 and extend forwardly to the bars 11 and 27.

Rotatably mounted upon the spindles 17, carried by the uprights 12, are driving or bull wheels 18, said wheels being driven from any suitable form of an engine 19, mounted upon the bars 10 of the frame.

The shaft 20 of the engine extends rearwardly through the usual or any preferred form of transmission 21 and into engagement at its rear end with the usual or any preferred form of differential gears in the gear housing 22, said differential gears being in turn connected with a driving shaft 23.

The driving shaft 23 projects through the upright 12 and has at its ends the roller gears 24, which mesh with the gear teeth 25 on the bull wheels 18, and by means of which, said wheels are driven. The forward ends 26 of the bars 11, or that portion of the bars beyond the upwardly extending portion 27, extend parallel with the forward ends of the bars 10, and are spaced therefrom to form a slot 28, in which is positioned a bed plate 29, which snugly fits between the cross bars 13 and 15.

As shown in Fig. 2 cultivators 31, such as are used in cultivating corn and the like are shown in use on the tractor, although it will be understood that other forms of cultivators, breaking plows, planters and the like may be substituted therefor. In order to position the cultivators so that they will be under convenient observation of the driver, the forward ends of the beam of the cultivators are attached to the brackets 32 which are adjustably attached to the side bars 11 of the frame, through the medium of bolts 33 adapted to extend through the holes 34 in the side bars 11. The brackets 32 are preferably positioned forwardly of the wheels 18 so that a downward pull caused by the drag of the cultivators will be directed against the forward portion of the frame of the tractor.

On the rear end of the frame there is mounted a driver's seat 35 above which there is a steering wheel 36 which operates the steering gear 37 through the steering rod 38, whereby the guide wheel 39 is controlled for steering the tractor.

In operating the device, power is applied to the driving axle 23 from the engine 19 in the usual manner and transmitted through the roller gears 24 and gear teeth 25 to the bull wheels 18, whereby the usual form of rear axle construction is eliminated, and a high arch frame may be used for permitting the tractor to operate over tall stalks of corn and the like. Owing to this construction, the tractor may be used in the cultivation of corn until the corn has reached the same or a greater height as permitted by the use of an ordinary horse drawn cultivator. Furthermore, by employing the means herein shown for attaching the various farm implements to the tractor, any make of farm implement may be operated therewith, and furthermore the tractor may be used for drawing breaking plows, harrows, planters and cultivators and in fact can be universally used for all cultivating purposes.

The invention claimed is:

1. A universal tractor comprising a frame structure consisting of a pair of upper bars, a pair of lower bars, cross bars connecting the said upper bars, a pair of rear upright bars connecting the rear portion of said lower and upper bars, spindles mounted on said uprights, wheels mounted on said spindles, internal gear teeth secured to said wheels within the periphery thereof, a shaft extending through the upper portion of said upright bars, means for driving said shaft, and gears secured to the ends thereof for engaging with said internal gear teeth for driving said wheels.

2. A universal tractor comprising a frame structure consisting of longitudinal members, bracing bars securing said longitudinal members together to form said frame, upright bars mounted at the rear of said frame on each side thereof, spindles mounted on said upright bars, tractor wheels mounted on said spindles, a driving shaft extending through the upper portion of said upright bars, means for driving said shaft, gears mounted on each side thereof, and internal gears secured within the outer periphery of said tractor wheels adapted to be engaged by said first mentioned gears for driving said wheels.

3. A universal tractor comprising a frame structure composed of a pair of upper bars, a pair of lower bars having a plurality of holes extending longitudinally therein, a plurality of bars for connecting and bracing said upper and lower bars, upright bars secured to said upper and lower bars near the rear thereof, spindles on said upright bars, tractor wheels mounted on said spindles, means adjacent said upper bars for driving said wheels, and brackets adjustably secured to said lower bars for attaching cultivating implements thereto whereby they will be longitudinally adjustable to said frame.

In witness whereof, we have hereunto affixed our signatures.

FRED H. COOK.
EARL B. SANDMANN.